United States Patent
Frankl et al.

(10) Patent No.: US 8,293,110 B2
(45) Date of Patent: Oct. 23, 2012

(54) METHOD OF TREATING WASTEWATER USING SEQUENCING BATCH AERATED LAGOON

(75) Inventors: Donald Frankl, Jefferson, SD (US);
Michael Chyi, Urbandale, IA (US);
Shihwu Sung, Ames, IA (US)

(73) Assignee: International Industries, Inc., Sioux City, IA (US)

( * ) Notice: Subject to any disclaimer, the term of this patent is extended or adjusted under 35 U.S.C. 154(b) by 242 days.

(21) Appl. No.: 12/627,319

(22) Filed: Nov. 30, 2009

(65) Prior Publication Data

US 2010/0258501 A1    Oct. 14, 2010

Related U.S. Application Data

(60) Provisional application No. 61/201,170, filed on Dec. 8, 2008.

(51) Int. Cl.
*C02F 3/00* (2006.01)
(52) U.S. Cl. .......... 210/607; 210/629; 210/620
(58) Field of Classification Search .......... 210/620–628, 210/607
See application file for complete search history.

(56) References Cited

U.S. PATENT DOCUMENTS

| | | | | |
|---|---|---|---|---|
| 5,863,433 A | * | 1/1999 | Behrends | 210/602 |
| 6,190,554 B1 | * | 2/2001 | Mandt | 210/605 |
| 2005/0035059 A1 | * | 2/2005 | Zhang et al. | 210/605 |

* cited by examiner

*Primary Examiner* — Chester Barry
(74) *Attorney, Agent, or Firm* — Kent A. Herink; Emily E. Harris

(57) ABSTRACT

A sequencing batch lagoon process is carried out in a minimum of two earthen lagoons and provides the treatment of municipal or industrial wastewater. Each lagoon is operated on fill-draw basis in a sequencing manner. Raw wastewater continues entering into one of the lagoons while the other lagoon is at full liquid level. The lagoon at the full liquid level will begin to discharge when the other lagoon at filling mode is reaching the full liquid level. The lagoon at the drawdown mode continues until the liquid level is down to the lowest liquid level. The wastewater feeding is then alternated to the lagoon which is at the lowest liquid level. The lagoon at the full liquid level shall have no contamination from raw wastewater or the lagoon at the filling mode. The biological reactions occur under aerobic and anoxic conditions. The aerobic conditions occur in the liquid or above the bottom sludge while the anoxic conditions occur near or within the bottom sludge. Air is provided by surface mechanical aerators or diffused aeration system. The aeration system is shut down during the discharge mode and is turned back on during the filling mode. Sludge in the lagoon is not wasted during the operation of sequencing batch lagoon process. The capacity of each lagoon depends on the number of lagoons.

17 Claims, 3 Drawing Sheets

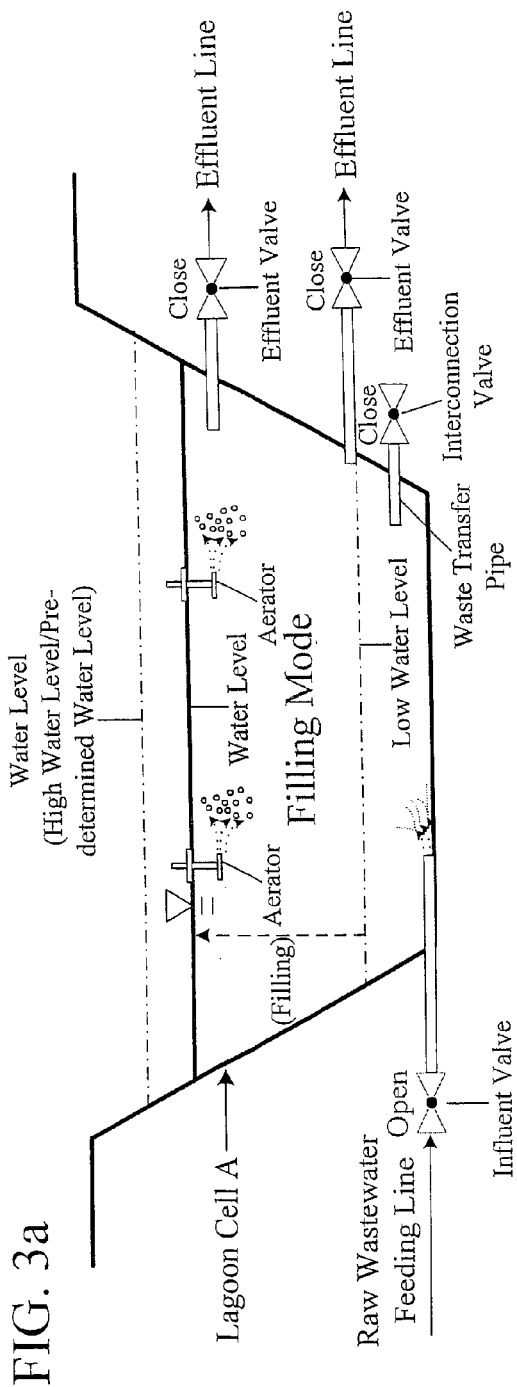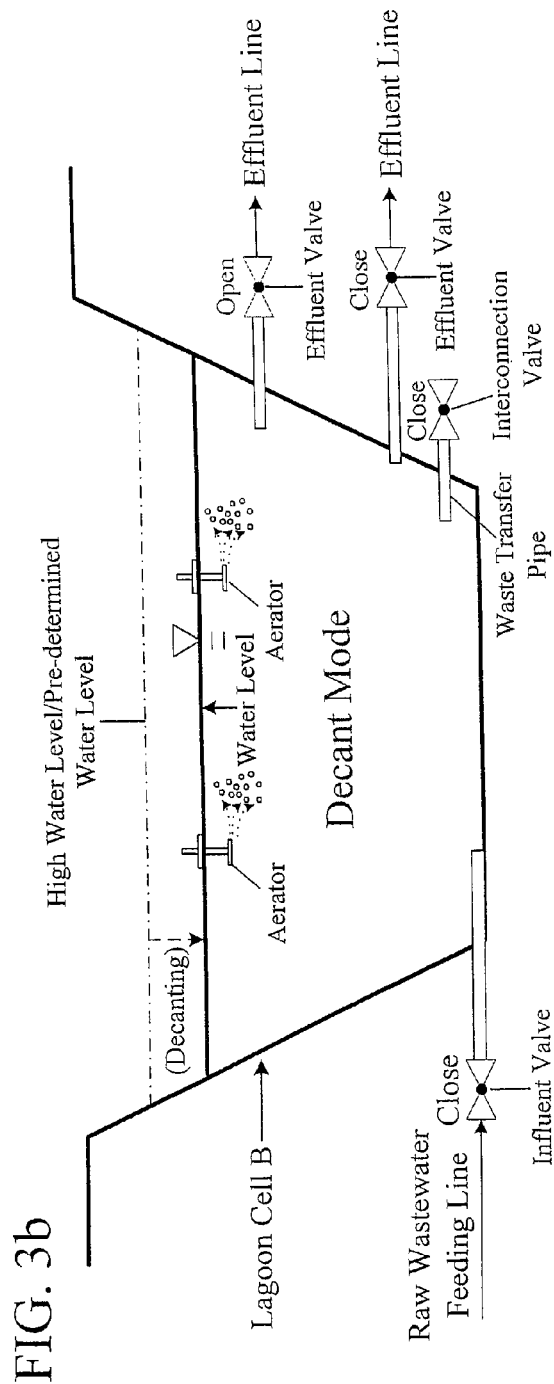
FIG. 3a
FIG. 3b

METHOD OF TREATING WASTEWATER USING SEQUENCING BATCH AERATED LAGOON

CROSS-REFERENCE TO RELATED APPLICATIONS

The application claims the benefit of provisional patent application Ser. No. 61/201,170, filed Dec. 8, 2008, and incorporates it herein by this reference.

FIELD OF THE INVENTION

This application relates generally to aerated lagoon treatment of wastes, and more particularly to a sequencing batch aerated lagoon process operating each lagoon cell individually.

BACKGROUND OF THE INVENTION

The biological lagoon systems in treating municipal wastewater mainly include facultative lagoons (non-aerated ponds) and aerated lagoons (partial mixing aerated ponds). Facultative lagoons do not have air input from an aeration system, which can be either a mechanical aerator system or a diffused bubble aeration system.

Facultative ponds are usually 4 to 8 feet in water depth with an aerobic layer overlying an anaerobic layer, often containing sludge deposits [Reference 1; all references are incorporated herein in their entirety]. They can be operated as controlled discharge lagoons or continuous discharge lagoon. The continuous discharge facultative lagoons typically are not permitted by regulatory agency in areas with very cold winter. The Iowa States Wastewater Design Standards requires that the detention time of one controlled discharge lagoon be at least 180 days. This requirement is to allow wastewater to be stored through cold winter and early spring. The effluent quality of continuous discharge facultative lagoon in winter cannot meet with water quality standards; especially to those streams with ammonia limits [2].

The concept of controlled discharge lagoons is to select a time of year when stream flow conditions are satisfactory for accepting a lagoon effluent discharge. In Mid-West states, a controlled discharge lagoon only allows to discharge in spring (April and May) and fall (October and November) [3]. The storage volume required for controlled discharge lagoons depends on the climates and water quality standards. If sufficient land is available, facultative ponds are a cost-effective means to provide wastewater treatment for municipal wastewater. Their operation is easy and their maintenance requirements are minimal. They are usually the most preferred system in hot climate zones [4].

Facultative pond design has been based upon biochemical oxygen demand removal; however, the majority of the suspended solids will be removed in the primary cell of a pond system. The $BOD_5$ (biological oxygen demand) area loading rate recommended for an average winter air temperature of less than 0° C. is 10-20 lb/acre/day. The more extreme the environment is, the lower the loading rate is [5]. The facultative lagoon system typically has three cells. Two-cell facultative lagoon system only applies to very small installations. The three-cell lagoon system is operated in series and the four or more cell system can be operated in parallel or in series [6]. The wastewater enters into the first cell and flows through following lagoon cells.

The nitrogen removal from facultative ponds could be related to pH, detention time, temperature, and algae growth. When water temperature is below 8° C., algae die off and the biological activity in removal of nitrogen in facultative pond is limited [4]. Therefore, the ammonia removal in facultative ponds cannot reach good ammonia removal in the cold winter. In such cold climate zones, the spring drawdown of a controlled discharge lagoon may not provide discharge effluent in low ammonia concentration. In addition, the new water quality standards imposed by EPA in March 2006 have resulted in many streams in State of Iowa to receive much lower ammonia and *E. coli* limits than previously allowed. Accordingly, the design of a controlled discharge lagoon to meet low effluent ammonia limits in cold climate zones may not be appropriate.

In aerated ponds (partial mixing aerated ponds), oxygen is supplied mainly through mechanical or diffused air aeration rather than by photosynthesis and surface aeration. In the partial mix aerated pond system, no attempt is made to keep all of the solids in the aerated ponds suspended. Aeration serves only to provide oxygen transfer adequate to oxidize the BOD entering the pond. Many aerated ponds have evolved from overloaded facultative ponds that required aerator installation to increase oxygenation capacity. Aerated ponds are generally 6 to 20 feet in water depth with detention times of 3 to 10 days [7]. The number of cells used in series affects the detention time needed for treatment. In the State of Iowa, the minimum detention time for a three-cell aerated lagoon is 31 days [3]. This is because the very cold winter significantly reduces the biological activities in removal of BOD. The longer hydraulic detention time compensates the loss of biological activity.

Aerated lagoons continue discharging effluent at normal operating conditions. Minimum of three-cell aerated lagoon are required. The first two cells are aerated and the third cell is a quiescent cell to settle out solids and discharge effluent. When an aerated lagoon is designed right, the effluent will meet the secondary treatment standards in $CBOD_5$ and total suspended solids (TSS) [2]. However, aerated lagoons are not designed to meet with stringent ammonia limits, especially in severe climate zones [3]. Aerated lagoon with insulated cover can retain wastewater temperature above 8° C. in winter [3]. With proper design, covered aerated lagoon is able to remove ammonia down to very low concentration in effluent. Several covered aerated lagoons constructed in the Cities of Villisca and Strawberry Point, Iowa have shown good ammonia removal all year round [3].

SUMMARY OF THE INVENTION

The present invention discloses an aerated lagoon wastewater treatment system with minimum of two lagoon ponds (cells). Each lagoon cell is operated individually and only accepting wastewater from the influent raw wastewater. No wastewater shall be allowed to flow through the interconnection pipe between lagoon cells. Each cell is operated at three sequencing modes of filling, isolation, and decant. The process is known as the sequencing batch aerated lagoon (SBAL) process. The isolation mode begins when high water level is reached at the end of filling mode. The isolation mode continues providing aeration and treatment until the water quality in the lagoon cell complies with discharge limits. The decant mode can then be initiated and continued until the low water level is reached. No sludge is removed out of the lagoon cell during three sequencing modes.

Aerated lagoons are not designed to treat ammonia and *E. coli* [3]. The controlled discharge lagoons in State of Iowa are required monitoring of *E. coli* and ammonia during drawdown beginning from May 2009. The threshold of ammonia and E. coli for this requirement is set at 4 mg/L and 126 #/100 ml, respectively. Although future requirements for controlled discharge lagoons in Iowa are not clear now, controlled discharge lagoons are suitable to design for treatment of $BOD_5$ and TSS only. The SBAL process could be the most viable alternative to save the infrastructures of lagoon systems. From the full-scale field study at Dunlap two-cell controlled discharge lagoon, this SBAL process was operated without any modifications of its existing infrastructure. The only difference was to shut off the interconnection valve and operated each cell with sequencing batch basis. The results have shown it can discharge with ammonia concentration at less than 0.2 mg/L and E. coli at less than 22 #/100 ml.

BRIEF DESCRIPTION OF THE DRAWINGS

Other objects, advantages, and novel features of the present invention will become apparent from the following detailed description of the invention when considered in conjunction with the accompanying drawings, wherein:

FIG. 3a is schematic illustration of approaching the high water level for the Cell A.

FIG. 3b is schematic illustration of the treated wastewater decant mode for the Cell B when the water level of Cell A is approaching to the high water level.

DETAILED DESCRIPTION OF THE INVENTION

Figure 1:
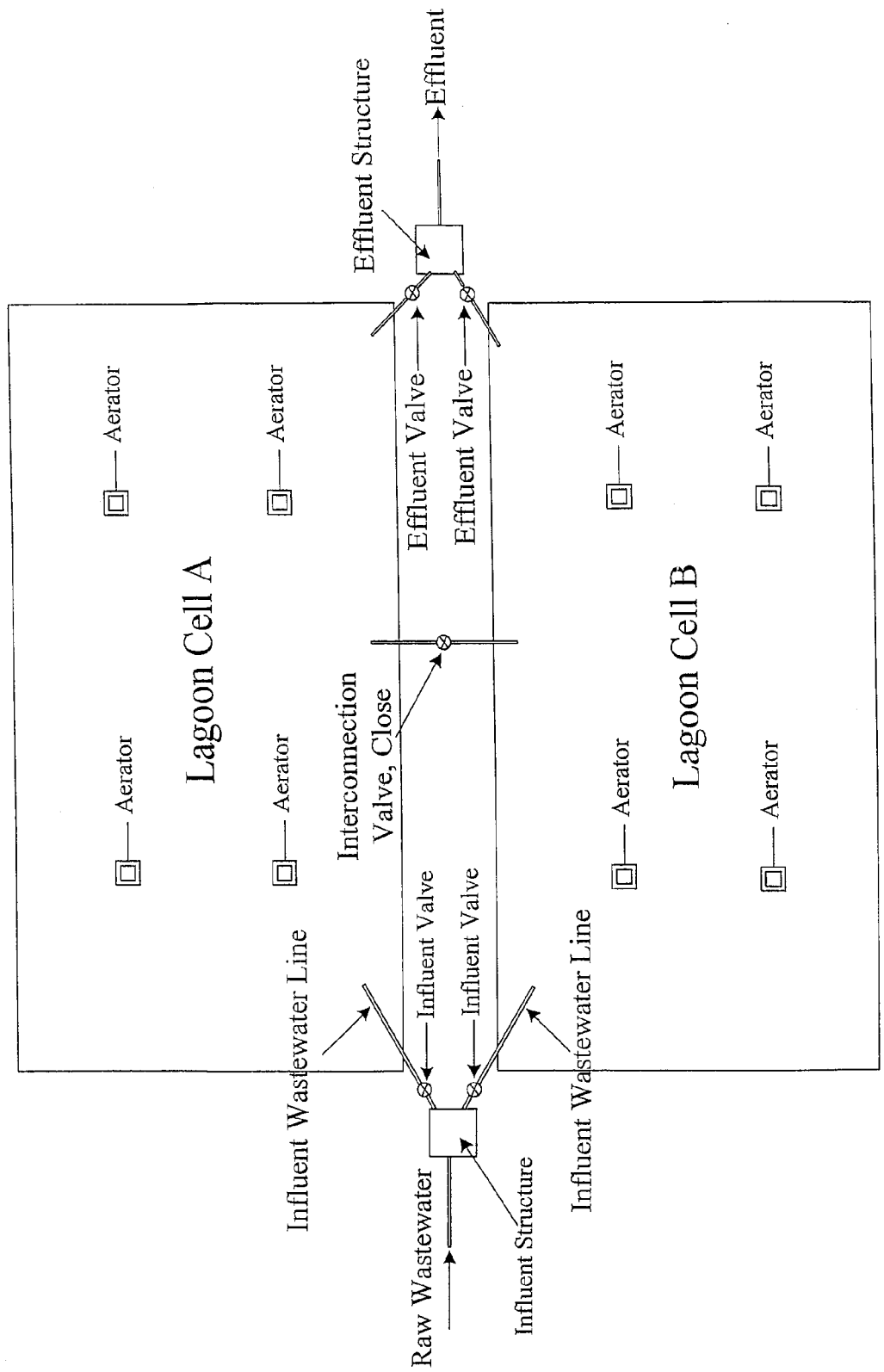
FIG. 1 is a schematic illustration of a typical layout of sequencing batch aerated lagoon (SBAL) process with a 2 lagoon cell system.
Figure 2A:
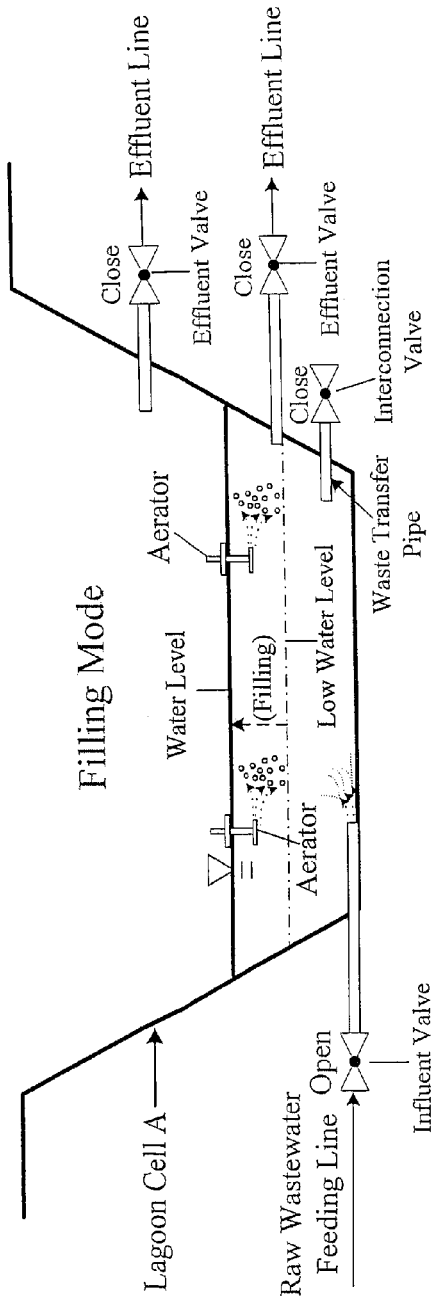
FIG. 2a is schematic illustration of the wastewater filling mode for the Cell A after the Cell B has reached the high water level.
Figure 2B:
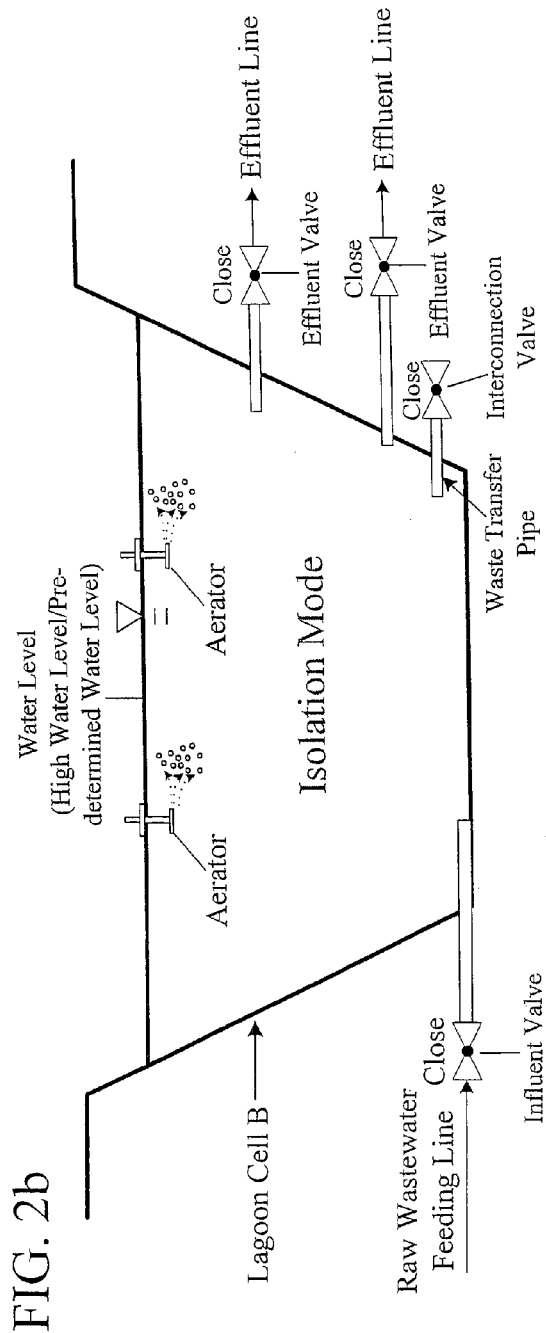
FIG. 2b is schematic illustration of the isolation mode for the Cell B when it has reached the high water level.

The present invention provides an aerated sequencing batch lagoon (SBAL) process for the treatment of municipal or industrial wastewater carried in a minimum of two lagoon cells. The following description is based on a two lagoon cell system; cell A and cell B. Each lagoon cell only accepts wastewater from the raw wastewater feeding line. The biological reactions occur under aerobic conditions in the liquid and anoxic conditions in the bottom sludge. Each lagoon cell is operated on a fill-draw basis in a sequencing manner.

When wastewater is entering into the cell A, the cell B is at a predetermined liquid level condition. Waste feeding into the lagoon cell A continues until it is filled to a predetermined liquid level. The lagoon cell B at the predetermined liquid level begins to discharge under the condition that the liquid level of lagoon cell A is close to its predetermined full liquid level. The drawdown of the lagoon cell B continues until a predetermined lowest liquid level is reached. The raw wastewater is then alternated to enter into the lagoon cell B. The steps of filling the lagoon cell B, discharging the lagoon cell A, and alternating waste feeding from the lagoon cell B to lagoon cell A occur in the next cycle. Air is provided by either a surface mechanical aeration system or a diffused bubble aeration system. The aeration system is shut down during the drawdown mode when the liquid level does not allow the aeration system to operate. The air is turned back on during the filling mode when the liquid level allows the aeration system to operate.

If the system has more than two lagoon cells, each lagoon cell will go through filling mode, full liquid mode (isolation mode), and decant mode in a sequencing order of all lagoon cells. The sequencing batch aerated lagoon (SBAL) process is applicable for the treatment of municipal wastewater in removal of ammonia, BOD, TSS, and E. coli. The effluent ammonia can be lower than 0.2 mg/L and the effluent E. coli can be less than 22 #/100 ml.

The unique feature of the SBAL process is that one lagoon cell is totally isolated after the filling mode is completed. This operation provides better reaction rate of treating wastewater and stop accepting E. coli of approximately $10^{6 \#/100}$ ml from raw wastewater. Accordingly, very low concentration of ammonia and E. coli can occur in the isolation lagoon cell with appropriate isolation period of time.

Another feature of this process is simple operations and easy maintenance when compared to other biological processes such as covered aerated lagoon, activated sludge system, or a mechanical plant which is currently required for treatment of ammonia and E. coli. All the process needs for the SBAL process is to operate and maintain the aeration system, and open and close valves.

An object of the present invention is to provide an economical biological process in converting the existing lagoon systems into the SBAL process. The existing lagoon system already has storage volume which can be used for the SBAL process. Besides, the operational and maintenance expense is much less than other processes. Typically, lagoon ponds with right design can last 40 years or longer. The only equipment required maintenance in the SBAL process is the aeration system.

A further object of the invention is to avoid disinfection requirement for existing aerated lagoons and controlled discharge lagoons if those lagoon systems can be modified to the SBAL process. Most small communities with population less than 2,000 people in Iowa either use aerated lagoons or controlled discharge lagoons. UV light disinfection process may not be appropriate application for lagoon systems due to the possible high TSS in effluent. The more appropriate disinfection method for aerated lagoons and controlled discharge lagoons could be chlorine disinfection. Chlorine disinfection will not likely be affected by high effluent TSS. However, the chlorine disinfection shall have more safety concerns and the process needs de-chlorination after the chlorination process. The operation of a chlorination disinfection facility could be an unexpected burden to those small municipalities. It also requires more maintenance than the UV light disinfection.

EXAMPLE 1

Full-Scale Field Study

A full scale study of the sequencing batch aerated lagoon (SBAL) process was carried out at the Dunlap wastewater treatment facilities (WWTF), Iowa. The population of Dunlap is 1153. The Dunlap WWTF is a two-cell controlled discharge lagoon and was constructed in 1968. The average daily flow is 120,000.0 gallons per day. Each cell has the storage volume of approximately 9.5 million gallons from the bottom 2 feet to the top liquid level of 7 feet. Each cell was installed with five units of 3-hp Aqua-Vac air inductors (International Industries, Inc., Sioux City, Iowa) in September 2006. The Aqua-Vac surface aerator can be operated at the minimum liquid depth of 3 feet. The average $BOD_5$ and ammonia concentration of the influent wastewater is approximately 200 mg/L and 30 mg/L, respectively.

The study began in May 2008. The two lagoon cells are named Cell A and Cell B. The interconnection valve, which controls the wastewater flow from cell A to cell B, was completely shut off on Apr. 29, 2008. Each cell only accepted waste from the waste feeding line. No waste shall be allowed to enter into the cell during its isolation period. The isolation mode begins after the cell reaches its predetermined full liquid level. The drawdown mode is completed at the water level of 2 foot. The following sequencing operations of Cells A and B are illustrative of the SBAL process and results. All of samples were collected by the plant operator. They were sent to the certified lab, Minnesota Valley Testing Laboratories, Inc. (New Ulm, Minn.) for measurement of effluent water quality.

Isolation Mode—Cell A

The Cell A reached the full liquid level on May 13, 2008. The waste feeding line was alternated to feeding the Cell B. Table 1 shows the ammonia and TSS concentrations of the Cell A from the beginning of the isolation period.

TABLE 1

| Date | Ammonia mg/L | TSS mg/L |
|---|---|---|
| May 13, 2008 | 13 | 29 |
| May 20, 2008 | 4.8 | |
| May 27, 2008 | <0.2 | |

This initial study shows that the SBAL process is able to convert ammonia from 13 mg/L to 4.8 mg/L within a week and to less than <0.2 mg/L within two weeks from the beginning of isolation stage.

Drawdown Mode—Cell B

The cell B reached the full liquid level on Jul. 1, 2008 and started drawdown on Oct. 10, 2008 and completed the drawdown on Oct. 21, 2008. $E.\ coli$, $CBOD_5$, and total nitrogen tests were added on the list for analyses. A pre-drawdown sample was taken on September 29 from the cell B near the effluent structure. It is required by Iowa Dept. of Natural Resources (IDNR) before the drawdown begins. The results of three samples are shown in Table 2.

TABLE 2

| Date | Ammonia mg/L | Nitrate + Nitrite mg/L | TKN mg/L | E. coli #/100 ml | CBOD$_5$ mg/L | TSS mg/L |
|---|---|---|---|---|---|---|
| Sep. 29, 2008 | <0.2 | | | <10 | 17 | 60 |
| Oct. 13, 2008 | <0.2 | <0.2 | 7.7 | <4 | | |
| Oct. 20, 2008 | <0.2 | | | 22 | 23 | |

The Oct. 20, 2008 sample was taken when the liquid depth was less than 2 feet. It is possible that the $E.\ coli$ number near the bottom of the pond is higher than the $E.\ coli$ number in the upper layer. The data has shown that the process can produce very low $E.\ coli$ numbers in the effluent at the fall drawdown. The total nitrogen in this study was less than 8 mg/L.

Isolation Mode—Cell A

The Cell A reached the full liquid level on Oct. 31, 2008 and the waste feeding line was alternated to feeding the cell B. The various parameters were monitored beginning Nov. 3, 2008. All samples were grabbed from the lagoon Cell A near the effluent structure. Table 3 shows the results.

TABLE 3

| Date | Ammonia mg/L | Nitrate + Nitrite mg/L | TKN mg/L | E. coli #/100 ml |
|---|---|---|---|---|
| Nov. 3, 2008 | <0.2 | 0.67 | 7.7 | 1390 |
| Nov. 10, 2008 | <0.2 | | | 37 |
| Nov. 17, 2008 | | | | <10 |

Based on the results, the Cell A could be discharged at any time after November 10 (10 days after isolation) and comply with the most stringent ammonia and $E.\ coli$ limits. In November, the SBAL was able to effectively remove ammonia and $E.\ coli$ within 13 days.

Drawdown Mode—Cell A

The Cell A started drawdown on Jan. 19, 2009 and completed it on Jan. 26, 2009. The pre-drawdown sample was taken on Jan. 6, 2009. Table 4 shows the results of the samples taken prior to and during the drawdown.

TABLE 4

| Date | Ammonia mg/L | Nitrate + Nitrite mg/L | TKN mg/L | E. coli #/100 ml | CBOD$_5$ mg/L | TSS mg/L |
|---|---|---|---|---|---|---|
| Jan. 6, 2009 | <0.2 | | | | 19 | |
| 1/19 | <0.2 | <0.2 | 5.3 | <10 | 15 | |
| 1/26 | 0.5 | | | | 10 | 30 |

These results indicated the ammonia and $E.\ coli$ in the effluent have been very consistent. The Cell B was isolated on January 30.

Isolation Mode and Drawdown Mode—Cell B

The Cell B was isolated on Jan. 30, 2009. Ammonia and $E.\ coli$ were continuously monitored in Cell B due to the concern of low temperature. The first sample was taken on February 3. The results are shown in Table 5.

TABLE 5

| Date | Ammonia mg/L | Nitrate + Nitrite mg/L | TKN mg/L | E. coli #/100 ml | CBOD$_5$ mg/L | TSS mg/L |
|---|---|---|---|---|---|---|
| Feb. 03, 2009 | 18.2 | | | 13,000 | | |
| 2/10 | 16.1 | | | 4,800 | | |
| 2/17 | 15.2 | | | 970 | | |
| 3/2 | 14.2 | | | 11,600 | | |
| 3/9 | 13.9 | | | 69.0 | | |
| 3/23 | 14.3 | | | 67.2 | 7 | 32 |
| 3/30 | 12.5 | | | 15.0 | | |
| 4/6 | 10.4 | | | N/A | | |
| 4/14 | 7.9 | | | N/A | 29 | 65 |
| 4/21 | 6.26 | | | N/A | | |
| 4/24 | 7.7 | | | N/A | | |
| 4/27 | 6.37 | | | <2 | 17 | 38 |
| 4/29 | 4.5 | | | N/A | | |
| 5/1 | 1.0 | | | N/A | | |
| 5/4 | 0.6 | 0.39 | 14.9 | <2 | 42 | 8 |

It took 38 days for $E.\ coli$ to get down to 69 #/100 ml after the Cell B was isolated on January 30. The ammonia concentration reached 1 mg/L on May 1. No significant change in ammonia concentrations in February and March. The SBAL process lost nitrifying ability through winter months. It is well known that nitrifying bacteria are slowly growing microorganisms. The nitrification was slowly coming back by the end of March. However, the ammonia drop rate increased through the month of April. The nitrification rate was significantly increased after April 24. It dropped from 4.5 to 1.0 mg/L from April 29 to May 1. The lagoon temperature was above 10° C. after mid-April. The following observations can be drawn. $E.\ coli$ removal is less sensitive to temperature comparing with ammonia removal in cold winter months. Significant nitrification happens when the lagoon temperature is above 10° C.

The Cell B started drawdown on Apr. 24, 2009 because the Cell A had reached high water level. Samples were taken during drawdown. From the drawdown samples, the ammonia dropped to 1 mg/L on May 1. This information indicates that the spring discharge has to be held until early May for this winter climate zone. Results of *E. coli* during drawdown were all less than 2 #/100 ml.

Isolation Mode and Drawdown Mode—Cell A

The Cell A was isolated on May 6, 2009 and began drawdown on Jul. 10, 2009. Ammonia and *E. coli* were monitored. The first sample was taken on May 11. The results are shown in Table 6.

TABLE 6

| Date | Ammonia mg/L | Nitrate + Nitrite mg/L | TKN mg/L | *E. coli* #/100 ml | $CBOD_5$ mg/L | TSS mg/L |
|---|---|---|---|---|---|---|
| May 11, 2009 | 10.3 | | | 27 | | |
| 6/01 | <0.5 | | | 19 | | |
| 6/30 | | | | | 17 | 62 |
| 7/13 | 2.75 | 0.38 | 10.3 | 4839 | 16 | 64 |
| 7/20 | <0.5 | | | 12910 | 29 | 81 |

The ammonia was dropped down to less than 0.5 mg/L on June 1. The *E. coli* was 27 #/100 ml on the first sample of May 11. The sample of June 30 was a pre-drawdown sample. The first sample of drawdown showed that the *E. coli* and ammonia increased to 4839 #/100 ml and 2.75 mg/L, respectively. The second sample of July 20 showed worse effluent discharge in *E. coli*, $CBOD_5$, and TSS. The drawdown was completed on July 22.

It was suspected that the Cell A was contaminated either from Cell B through the interconnection pipe or influent raw wastewater. The influent flow control valve was not functioning at the beginning of this study. Two expandable pipe bladders were used to control influent flow into the isolation cell. A dye test was conducted on July 24 to prove the above assumption. The Cell B was installed another expandable pipe bladder to fully stop raw wastewater into the Cell B. The influent manhole was then filled with raw wastewater and poured with one pint of fluorescent dye. The raw wastewater in the influent manhole was drained in less than one minute. It was observed that wastewater was flowing into the Cell B's influent pipe. The dye was flowing to the water surface near the outfall influent pipe approximately 14 minutes after the dye was applied. The dye test proved that the Cell A was contaminated and resulted in unsatisfactory effluent water qualities. The City of Dunlap has installed one influent valve to the Cell A and will install another one to the Cell B once the cell B has completed drawdown.

Filling Mode, Isolation Mode, and Drawdown Mode—Cell B

The Cell B began the filling mode on May 6, 2009. The aerators were not turned on until July 8. The water depth was increased from 2 feet to 5 feet on July 8. This operation is different from prior testing for which the aerators were turned on at the water depth of 3 feet. This could save some energy consumption if the water quality can be maintained prior to drawdown. Dissolved oxygen (D.O.) profiles were measured at different locations in the Cell B on July 24. This was 16 days after aerators were turned on. Results of D.O. measurement showed that D.O.s were from 3 mg/L (near bottom sludge) to 5 mg/L (1 foot below surface). Three samples were tested for *E. coli*, ammonia, $CBOD_5$, and TSS. The results are shown in Table 7.

TABLE 7

| Date | Ammonia mg/L | Nitrate + Nitrite mg/L | TKN mg/L | *E. coli* #/100 ml | $CBOD_5$ mg/L | TSS mg/L |
|---|---|---|---|---|---|---|
| Jul. 27, 2009 | 0.66 | | | 1961 | | |
| 8/03 | 0.77 | | | 297 | 25 | 73 |
| 8/10 | 1.43 | | | 27,550 | 21 | 72 |
| 8/24 | <0.5 | | | 27,750 | | |
| 9/04 | | | | 100 | | |
| 9/8 | | | | | 17 | 57 |
| 9/14 | | | | 22 | | |
| 9/21 | <0.5 | <0.2 | 7.7 | 4 | 14 | 42 |
| 9/28 | | | | 4 | 13 | 40 |

The first sample was taken on 76 days after isolation. On August 3, the ammonia concentration was less than 1 mg/L. The *E. coli* was at 297 #/100 ml. For an unknown reason, the *E. coli* increased to 27,550 #/100 ml on August 10 and 24's samples. The North Cell was isolated on August 29. The *E. coli* dropped to 100 #/100 ml on September 4 and 22 #/100 ml on September 14. It can therefore conclude that isolation significantly affect the performance of lowering *E. coli* numbers. The *E. coli* numbers dropped from 27,750 to 100 per 100 ml in six days after the isolation. The drawdown began on September 18. The results of drawdown samples on September 21 and 28 show very good removal of ammonia and *E. coli*.

Performance Comparison

The discharge effluent in ammonia from three aerated lagoons and one controlled discharge lagoon are compared with the SBAL process. All of them are located in State of Iowa. At this time, only one set of effluent ammonia was obtained from one controlled discharge lagoon, Merrill wastewater treatment facility (WWTF). All data were obtained from monthly operating reports, Iowa DNR NPDES (National Pollutant Discharge Elimination System) data base. The results are shown in Table 8.

TABLE 8

| | Facility | | | | | | | | |
|---|---|---|---|---|---|---|---|---|---|
| | Sioux Rapids[1] | | Woodward[1] | | Denver[1] | | Merrill[2] | | Dunlap[3] | |
| | Ave.[4] | Max.[5] | Ave. | Max. | Ave. | Max. | Ave. | Max. | Ave. | Max. |
| 2008 | | | | | | | | | | |
| October | 18.4 | 22.0 | <0.2 | <0.2 | 6.5 | 16.1 | | | <0.2 | <0.2 |
| November | 21.8 | 23.0 | 0.14 | 0.56 | 7.3 | 11.9 | | | | |
| December | 28.8 | 32.0 | 0.64 | 0.78 | 13.6 | 16.1 | | | | |
| 2009 | | | | | | | | | | |
| January | 37.0 | 40.0 | 2.0 | 2.0 | 18.8 | 21.9 | | | <0.2 | <0.2 |

TABLE 8-continued

| | Sioux Rapids[1] | | Woodward[1] | | Denver[1] | | Merrill[2] | | Dunlap[3] | |
|---|---|---|---|---|---|---|---|---|---|---|
| | Ave.[4] | Max.[5] | Ave. | Max. | Ave. | Max. | Ave. | Max. | Ave. | Max. |
| February | 36.3 | 40.0 | 4.5 | 6.5 | 22.3 | 24.1 | | | | |
| March | 30.3 | 35.0 | 3.4 | 4.4 | 13.7 | 18.0 | | | | |
| April | 27.0 | 28.0 | 3.4 | 4.4 | 8.1 | 8.7 | | | | |
| May | 26.8 | 28.0 | 3.5 | 6.4 | 4.2 | 5.4 | 21.3 | 61.0 | 0.8 | 1.0 |
| June | N/A | N/A | 6.2 | 6.5 | 5.1 | 6.3 | | | | |
| July | 22.6 | 24.0 | 0.2 | 0.6 | <0.1 | <0.1 | | | 1.6* | 2.7* |
| August | 18.2 | 21.0 | N/A | N/A | 1.2 | 3.5 | | | | |
| September | 16.7 | 19.0 | <0.2 | <0.2 | 1.5 | 1.7 | | | <0.5 | <0.5 |

Note:
[1] aerated lagoon facility
[2] controlled discharge lagoon facility
[3] sequencing batch aerated lagoon (SBAL) process
[4] the average of effluent ammonia samples in a month, mg/L as nitrogen
[5] the maximum effluent ammonia sample in a month, mg/L as nitrogen
*results were collected from the contaminated cell during drawdown The SBAL process produced much better effluent quality in ammonia except discharge in July 2009. It was proved that the treated wastewater was contaminated by raw wastewater during and before discharge. For *E. coli* treatment, Sioux Rapids and Denver WWTF are required to install one disinfection facility by Iowa Department of Natural Resources. Woodward WWTF has installed one chlorination facility in 2003. The SBAL process can produce effluent in *E. coli* less than 22 #/100 ml without a disinfection facility.

SUMMARY

The SBAL process is capable of achieving low ammonia concentration (<0.2 mg/L) and *E. coli* numbers (<22#/100 ml) in discharge effluent. The SBAL process can be best fit to controlled discharge lagoon. The conversion only requires installation with one aeration system and very minimal modifications to the existing structures. The SBAL process needs to operate the isolation mode from winter to early May in State of Iowa due to the cold winter. Removal of grit and inorganic materials are not required for the SBAL process.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

REFERENCES

1. EPA Design Manual—Municipal Wastewater Stabilization Ponds, pg 2, EPA-625/1-83-015.
2. Observed data from the Iowa DNR NPDES data base. Iowa State Wastewater Design Standards, Chapter 18C.
3. Crites, R. and Tchobanoglous, G. Small and Decentralized Wastewater Management System, Chapter 8, McGraw Hill, Inc., New York, 1998
4. EPA Design Manual "Municipal Wastewater Stabilization Ponds", pg 76, EPA-625/1-83-015.
5. Ten States Recommended Standards for Wastewater Facilities, Chapter 90, 2004 Edition, Health Education Services Division, New York.
6. EPA Design Manual "Municipal Wastewater Stabilization Ponds." Chapter 1, EPA-625/1-83-015.

We claim:

1. A method of treating municipal or industrial wastewater in removal of biological oxygen demand (BOD), ammonia, *E. coli*, and total suspended solids using a minimum of two earthen lagoon cells, comprising the steps of:
   a. filling a first one of the lagoon cells with wastewater until a first predetermined full liquid level is reached;
   b. switching the waste feeding to the second lagoon cell which is at low liquid level;
   c. isolating the wastewater within the first lagoon cell to maintain the aerobic reaction conditions of the cell resulting in the accumulation of sludge in the first lagoon cell;
   d. drawing down the treated wastewater from the first lagoon cell, when the second lagoon cell is reaching the predetermined full liquid level, until a first predetermined lowest liquid level is reached; and
   e. without removing the sludge, repeating in sequence the filling, isolation, and drawdown steps.

2. The method of claim 1 wherein wastewater feeding into the system continues all year round.

3. The method of claim 1, further comprising a second predetermined lowest liquid level greater than the first predetermined lowest liquid level and wherein the drawdown step reaches the second predetermined lowest liquid level.

4. The method of claim 1, further comprising a second predetermined full liquid level lower than the first predetermined full liquid level and wherein the filling step reaches the second predetermined full liquid level.

5. The method of claim 1 wherein the wastewater is isolated in each lagoon cell during the filling step and the isolation step.

6. The method of claim 1 wherein the drawdown step is initiated when the water quality in the lagoon cell under isolation complies with predetermined discharge limits.

7. The method of claim 1 further comprising the step of providing a wastewater feeding line operable to discharge water into the lagoon cells and wherein each lagoon cell only accepts wastewater from the wastewater feeding line.

8. The method of claim 1 wherein wastewater is prevented from flowing from one lagoon cell to another lagoon cell.

9. The method of claim 1 further comprising the step of providing surface floating aerators or a diffused bubble aeration system, and wherein the aerobic condition of the waste can be maintained by the surface floating aerators or the diffused bubble aeration system.

10. The method of claim 9 wherein the aeration system provides partial mixing to the lagoon cells.

11. The method of claim 9 wherein the total suspended solids (TSS) suspended by the aeration system is less than 100 mg/L.

12. The method of claim 9 wherein the aeration system is shut off during the drawdown step at the liquid level unable to operate the aeration system.

13. The method of claim 9 wherein the aeration system is turned on during the filling step.

14. The method of claim 9 wherein the aeration system is shut off when the water temperature is down below 6° C. and shall be operated when water temperature is at 6° C. or above.

15. The method of claim 1 wherein the full liquid depth is between 5 feet and 20 feet.

16. The method of claim 1, further comprising the step of providing an effluent valve and wherein discharging the treated wastewater is controlled by opening the effluent valves.

17. The method of claim 1 wherein the earthen lagoon is constructed of dirt without volume limitation.

* * * * *